(12) United States Patent
Flett

(10) Patent No.: US 8,245,801 B2
(45) Date of Patent: Aug. 21, 2012

(54) EXPANDABLE ENERGY STORAGE CONTROL SYSTEM ARCHITECTURE

(75) Inventor: Frederick P. Flett, Indio, CA (US)

(73) Assignee: Bluways USA, Inc., Poway, CA (US)

(*) Notice: Subject to any disclaimer, the term of this patent is extended or adjusted under 35 U.S.C. 154(b) by 364 days.

(21) Appl. No.: 12/612,964

(22) Filed: Nov. 5, 2009

(65) Prior Publication Data

US 2010/0133025 A1   Jun. 3, 2010

(51) Int. Cl.
B60K 6/20   (2007.10)
(52) U.S. Cl. ............... 180/65.21; 180/65.29; 180/65.31
(58) Field of Classification Search ............. 180/65.2, 180/65.245, 65.29, 65.265, 65.275, 65.21, 180/65.31; 307/75, 9.1, 82; 318/139, 376
See application file for complete search history.

(56) References Cited

U.S. PATENT DOCUMENTS

| | | | | |
|---|---|---|---|---|
| 5,710,699 | A * | 1/1998 | King et al. | 318/139 |
| 6,233,935 | B1 * | 5/2001 | Kahlon et al. | 60/605.1 |
| 6,364,042 | B1 | 4/2002 | Joachim | |
| 7,122,914 | B2 * | 10/2006 | Caruthers | 180/65.245 |
| 7,571,683 | B2 * | 8/2009 | Kumar | 318/139 |
| 7,854,203 | B2 * | 12/2010 | Kumar | 318/139 |
| 8,013,548 | B2 * | 9/2011 | King et al. | 318/139 |
| 8,039,987 | B2 * | 10/2011 | Sawada et al. | 307/9.1 |
| 2002/0157881 | A1 * | 10/2002 | Bakholdin et al. | 180/65.2 |
| 2006/0152085 | A1 * | 7/2006 | Flett et al. | 307/75 |

FOREIGN PATENT DOCUMENTS

| | | |
|---|---|---|
| JP | 05-030608 | 2/1993 |
| JP | 09-46921 | 2/1997 |
| JP | 20040056995 | 2/2004 |
| JP | 20040087425 | 3/2004 |
| JP | 20050094917 | 4/2005 |
| JP | 2009508763 | 3/2009 |
| KR | 1020070038515 | 4/2007 |
| KR | 1020070060752 | 6/2007 |
| KR | 1020070076544 | 7/2007 |
| KR | 1020080032909 | 4/2008 |
| KR | 1020080086941 | 9/2008 |

OTHER PUBLICATIONS

Notification, International Search Report and Written Opinion from PCT/US2010/55490 dated Jul. 14, 2011.
Notification, International Search Report and Written Opinion from PCT/US2010/55491 dated Jun. 28, 2011.

* cited by examiner

*Primary Examiner* — Hau Phan
(74) *Attorney, Agent, or Firm* — Stephen C. Beuerle; Procopio Cory Hargreaves & Savitch LLP

(57) ABSTRACT

A hybrid electric vehicle drive system comprises a first power bus electrically coupled to a motive power subsystem and a drive wheel propulsion assembly; a second power bus electrically coupled to the first power bus and a plurality of energy storage subsystems, wherein the first power bus is configured to allow electrical power to be transmitted among the motive power subsystem, the drive wheel propulsion assembly, and the second power bus, and wherein the second power bus is configured to allow electrical power to be transmitted among the plurality of energy storage subsystems and the first power bus.

16 Claims, 6 Drawing Sheets

EXPANDABLE ENERGY STORAGE CONTROL SYSTEM ARCHITECTURE

FIELD OF THE INVENTION

The present invention relates generally to motor vehicles, and more particularly, hybrid electric vehicles (HEVs) wherein an electric motor in the body or on the body-frame drives the vehicle. The present invention includes subject matter having a specific or particular functional arrangement of or interconnection between two or more major components (e.g., wheel, motor/generator, engine, etc.) of a drive train. Some embodiments relate to a vehicle having an arrangement for control of an individual subunit (i.e., energy storage) of a hybrid electric power train.

BACKGROUND OF THE INVENTION

Typical hybrid electric vehicles (HEVs) use combinations of energy sources to provide motive power to a vehicle. In some serial HEVs, an internal combustion engine is used to power an electric generator, whereby electricity from the generator is then used to power an electric motor that is used to drive the vehicle. The electricity from the generator may also be used to charge an on-board energy storage unit, which can be used to run the electric motor when the engine is off, or in some cases, to assist in running the motor in tandem with the engine. Such HEVs frequently have regenerative braking systems, which running the motor as an electric generator during braking to provide braking torque and recapture propulsion energy. In addition, such HEVs will typically transmit propulsion energy between the generator, the electric motor, and the energy storage across a common DC propulsion bus.

Of particular interest here are heavy duty HEVs. A heavy duty vehicle is legally defined as being over 8,500 lbs. Heavy duty HEVs (as used herein) are typically over 10,000 lbs, and may include metropolitan transit buses, semi tractor trailers, refuse collection and/or other heavy duty vocational trucks, etc. Moreover, unlike stationary hybrid systems and even automotive HEVs, heavy duty HEVs face unique challenges associated with their substantially higher power levels, the mobile environment under substantially higher loads, increased safety requirements, and increased performance and duty cycle requirements.

The choice and design of the HEVs propulsion energy storage unit is a key parameter for the HEV drive system's overall performance. While various energy storage technologies are available, the choice typically represents compromises between desired power density and desired energy density. For example, energy-type energy storage devices, such as lead-acid or lithium-ion rechargeable batteries have low power densities on the order of 100 W/kg, but have high energy densities on the order of 100 Wh/kg. Power-type energy storage devices, such as ultracapacitors, on the other hand, have high power densities on the order of 5,000 W/kg, but have low energy densities on the order of 10 Wh/kg. Accordingly, ultracapacitors are able to provide a great deal of power over a short period of time, while batteries are able to provide a modest amount of power over a relatively long period of time. The rechargability of these energy storage modules substantially mirrors these characteristics.

An ultracapacitor is typically able to receive and store a great deal of power over a short period of time, while a rechargeable battery must be presented with smaller amounts of power over longer periods of time. Accordingly, during a regenerative braking period, an ultracapacitor may be able to store all the electricity produced during one braking period, but this might use up all the ultracapacitors capacity; while a battery may be able to receive charge during many braking periods, but may not be able to receive the entire amount of electricity produced during one braking period. Typically, regardless of the choice of technology, the energy storage unit will often need to be oversized to meet all of the vehicle's performance requirements.

Since the state of charge (SOC) of the on-board energy storage module necessarily fluctuates during driving, it is common for the energy storage to include a DC/DC converter between itself and the DC propulsion for power to flow as needed. As a practical matter though, the DC/DC converter may face unique challenges and be limited in its performance and capacity to buck or boost voltages. In particular, under driving conditions it may be necessary to reliably boost relatively large currents (e.g., 300 A) in a mobile environment. With the high voltages encountered HEVs, a high power, insulated-gate bipolar transistor ("IGBT")-based DC/DC converter may be required. However, IGBT (or similar) DC/DC converters may be have certain drawbacks in this application. In particular, with DC/DC converters, the greater the ratio that the voltage is bucked or boosted, the greater the need for fast switching. However, IGBT's are limited in their switching frequency (e.g., 20 kHz). As a result of this limitation voltage ripple is increased at the higher frequencies and power quality is reduced. In addition, IGBT's emit heat at high switching frequencies and become less efficient. Moreover, at the power levels associated with vehicle propulsion thermal management may be required.

In a heavy duty hybrid application, these challenges may more pronounced. For example, in a heavy duty HEV having a battery-based energy storage, a DC/DC converter may need to convert voltage across a step from a low SOC of 200 VDC to a high SOC of 700 VDC; and where the HEV has an ultracapacitor-based energy storage instead, the DC/DC may need to boost voltage from a nominal (~0 VDC) voltage up to 700 VDC. Thus, in either type of HEV, at low energy storage SOC, the voltage step is substantial, and undesirable losses and noise are introduced. To mitigate some of these deficiencies active cooling, electronic noise reduction, etc. may be used however. Thus, in current hybrid drive systems, additional and/or high performance equipment, which is often expensive, may be required to meet these high voltage ratio and propulsion power requirements.

SUMMARY

The disclosure relates to an efficient, inexpensive, and reliable architecture blending a battery-based energy storage with an ultracapacitor-based energy storage. In particular, the architecture includes a multi-level DC/DC converter topology that can independently operate on multiple DC-Buses and power sources having the intrinsic capability to operate in parallel to capture and conduit regenerative energy among multiple power and energy sources.

According to various embodiments of the disclosure, energy storage systems for use in hybrid electric vehicles (HEVs) that combine rechargeable battery packs with ultracapacitors are provided. In these embodiments, generally, dual electrical buses are provided within the vehicle drive train. An ultracapacitor energy storage subsystem and a battery energy storage subsystem are coupled to a first electrical bus that is maintained at a first voltage. The first electrical bus, a vehicle engine, an electrical motor, and other drive train elements are coupled to a second electrical bus that is maintained at a second voltage.

According to an embodiment of the disclosure, a hybrid electric vehicle drive system comprises a first electrical power bus electrically coupled to a motive power subsystem and a drive wheel propulsion assembly; a second power bus electrically coupled to the first power bus and a plurality of energy storage subsystems, wherein the first power bus is configured to allow electrical power to be transmitted among the motive power subsystem, the drive wheel propulsion assembly, and the second power bus; and wherein the second power bus is configured to allow electrical power to be transmitted among the plurality of energy storage subsystems and the first power bus.

According to another embodiment of the disclosure, a method for operating a hybrid electric vehicle comprises transmitting power generated at a motive power subsystem on a first power bus, wherein the first power bus is coupled to a drive wheel propulsion assembly and a second power bus; and transmitting power stored by an energy storage subsystem on the second power bus, wherein the second power bus is coupled to the first power bus and a plurality of energy storage subsystems.

Other features and aspects of the disclosure will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments of the disclosure. These drawings are provided to facilitate the reader's understanding of the disclosure and shall not be considered limiting of the breadth, scope, or applicability of any claimed invention. It should be noted that for clarity and ease of illustration these drawings are not necessarily made to scale.

The figures are not intended to be exhaustive or to limit the claimed invention to the precise form disclosed. It should be understood that the invention can be practiced with modification and alteration, and that the invention be limited only by the claims and the equivalents thereof.

DETAILED DESCRIPTION

Figure 1:
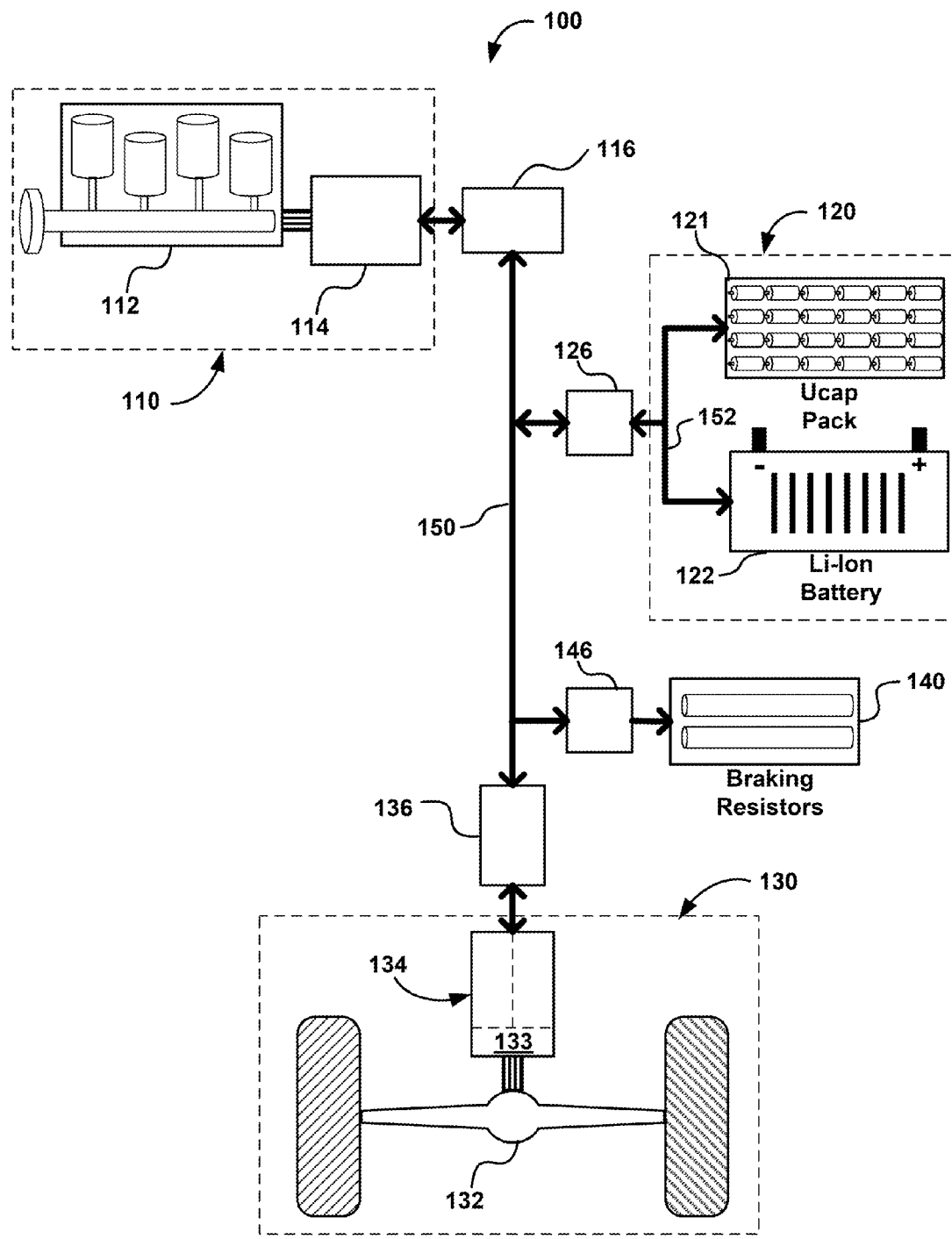
FIG. 1 illustrates a schematic of a hybrid electric vehicle drive system according to an embodiment of the disclosure.

Referring to FIG. 1, depicting a drive system 100 of a hybrid electric vehicle (HEV), the various vehicle subsystems are coupled to a common electrical bus 150. The HEV drive system 100 may include multiple energy sources, such as a motive energy subsystem 110, an energy storage subsystem 120, and a drive wheel propulsion assembly 130 in a regenerative braking mode ("regen").

Motive energy subsystem 110 may comprise power generating components that serve as the ultimate source for motive power for the vehicle. For example, a motive energy subsystem may comprise an internal combustion engine (ICE) or a compressed air engine coupled to a generator, a fuel cell, or, in a fully electric vehicle, and a large capacity electric storage system. In the illustrated embodiment, the motive energy subsystem 110 comprises an internal combustion engine 112 mechanically coupled to an electrical generator 114. A variety of internal combustion engines and electrical generators may be used in different embodiments. For example, in a heavy-duty hybrid vehicle, internal combustion engine 112 may comprise a V10 gasoline engine with about 7 L of displacement and electrical generator 114 may comprise a three phase AC permanent magnet synchronous generator rated at about 250 kW. In other embodiments, such as would be used in a passenger vehicle, less powerful components may suffice. In still further embodiments, different ICEs, such as diesel, CNG, flex-fuel, etc., for example.

As illustrated, this embodiment further comprises a drive wheel propulsion assembly 130 that may operate in a propulsion mode or in a regenerative braking mode. Drive wheel propulsion assembly 130 may comprise one or more electrical motors 134 that are mechanically coupled to the vehicle drive wheel assembly 132, for example, via a combining gearbox 133. During operation, the electrical propulsion motor 134 may be powered solely by the energy storage 120, or the energy storage 120 may be used to augment power provided by the engine 112.

As a key added feature of HEV efficiency, many HEVs recapture the kinetic energy of the vehicle via regenerative braking rather than dissipating kinetic energy via friction braking. In particular, regenerative braking ("regen") takes place when the electric propulsion motor 134 is switched to operate as a generator, and a reverse torque is applied to the drive wheel assembly 132. In this process, the vehicle is slowed down by the electric drive motor 134, which converts the vehicle's kinetic energy to electrical energy. As the vehicle transfers its kinetic energy to the motor 134, now operating as a generator, the vehicle slows and electricity is generated and stored in the energy storage subsystem 120. When the energy storage 120 reaches a predetermined capacity (e.g., fully charged), the drive wheel propulsion assembly 130 may continue to operate in regen for efficient braking, however, instead of storing the energy generated, any additional regenerated electricity may be dissipated through a resistive braking resistor 140. Typically, the braking resistor 140 will be included in a cooling loop that dissipates the excess energy as heat.

The propulsion energy storage subsystem or module 120 may be made up of a plurality of energy storage cells or components. Importantly, the energy storage subsystem 120 comprises both an ultracapacitor energy storage subsystem 121 and a battery energy storage subsystem 122. Thus, energy storage 120 combines power-type and energy-type energy storage devices (e.g., ultracapacitors and batteries, respectively) on a common DC bus. While power-type energy storage devices and energy-type energy storage devices may vary significantly within their respective classes, with reference to each other, a power-type energy storage device used here will generally deliver at least 300% the power of energy-type energy storage device used here, and the a energy-type energy storage device used here will generally store at least 3000% the energy of power-type energy storage device used here.

With the power demands associated with a heavy duty hybrid electric vehicle, the battery, being an energy-type device, tends to be the most limiting factor in drive system propulsion power flow. In particular, since current battery technology is limited in its power capacity, a vehicle may require more power, during acceleration/deceleration than a battery can provide. Placing both the battery and ultracapacitor on the same DC bus alleviates this limitation because the ultracapacitors, being power-type devices, can quickly provide the needed power delivery and storage. In addition, since the current ultracapacitor technology is limited by its energy density, a vehicle may require more energy in sustained operations than ultracapacitors can provide. So, similarly, including both the battery and ultracapacitor on the same DC bus alleviates this limitation because the battery provides much higher energy density.

Although the terms "ultracapacitor" and "battery" are used singularly herein, one of ordinary skill in the art will understand that ultracapacitor and battery can refer to one or a plurality of ultracapacitors and batteries, respectively. In the description of some embodiments, the term ultracapacitor might refer to one or more arrays of individual ultracapacitors. For example, in one embodiment the term ultracapacitor refers to an array of 144 individual capacitors, each having a capacitance of 2600 F and being capable of providing 2.5 V continuous DC current at between 400 and 600 A. Similarly, the overall energy storage characteristics may vary from vehicle to vehicle in light of its drive cycle, its physical parameters, and its performance requirements. For example, energy storage 120 for heavy-duty vehicles (e.g., having a gross weight of over 10,000 lbs.) may include one or more ultracapacitor modules or packs 121, such as two parallel ultracapacitor packs comprising a total of 144 ultracapacitor cells (not shown) and having an overall rated DC voltage of 230 VDC and storing 0.3 kWh of energy. Similarly, the energy storage 120 may further include one or more batteries 122, such as a nickel metal hydride battery or lithium ion battery comprising one or more lithium-ion batteries having DC voltages of 525 VDC, capable of storing 15 kWh, and able to provide 30 kW of power. As described in more detail below, the ultracapacitor subsystem 121 and battery subsystem 122 may be coupled together using an energy storage "blending" bus 152 that allows energy to be transferred between the subsystems.

In order to freely transmit power between motive energy subsystem 110, energy storage subsystem 120, drive wheel propulsion assembly 130, and resistive braking resistor 140, these components/subsystems may be electrically coupled to a power bus, in particular a DC high power/high voltage bus 150. In this way, energy can be transferred within the high power hybrid drive system as needed. In further configurations, some of these components/subsystems may act as voltage sources, while others act as voltage draws. For example, if energy storage system 120 is depleted, it may act as a voltage draw during a regen mode in which the drive wheel propulsion subsystem 130 acts as a voltage source. As another example, if the vehicle is being driven solely from engine power, engine subsystem 110 may comprise a voltage source while drive wheel propulsion subsystem 130 acts as a voltage draw. Braking resistor 140 always operates as a voltage draw.

In some embodiments, the interfaces between these various components/subsystems and the high power/high voltage propulsion DC bus 150 may comprise various inverters, rectifiers, DC/DC converters, and switches. For example, (i) in embodiments where generator 114 comprises an AC generator, element 116 may comprise a rectifier configured to output DC power at a predetermined standard voltage; (ii) in typical embodiments, ultracapacitor module 121 and battery module 122 may operate on DC power and element 126 may comprise a DC-to-DC ("DC/DC") converter; (iii) in embodiments where motor-generator 134 is an AC induction motor-generator, element 136 may comprise an inverter/rectifier configured to operate as an inverter during driving and a rectifier during braking; and (iv) element 146 will typically function as a switch. In some further embodiments, such as an embodiment where the motive energy system 110 comprises a fuel cell, the system 110 might produce DC current directly, and inverter 116 may be replaced with an appropriate DC/DC converter for connection to bus 150.

With regard to the interface between energy storage subsystem 120 and high power propulsion DC bus 150, element 126 preferably includes a DC/DC converter configured to condition the stored energy into a form that can be used for vehicle propulsion. In general, the purpose of a DC/DC converter is to step-up (boost) or step-down (buck) voltages from an energy or power source such as a battery, or ultracapacitor. Accordingly, element 126, comprising a DC/DC converter, may be configured to boost or buck voltages on the energy storage "blending" bus 152 to the voltage required by the high power propulsion DC bus 150.

As a practical matter, a DC/DC converter may face unique challenges and be limited in its performance and capacity to buck or boost voltages in a single-bus application. In particular, under driving conditions it may be necessary to reliably boost relatively large currents (e.g., 300 A) in a mobile environment. With the high voltages encountered in hybrid drive system 100, a high power, insulated-gate bipolar transistor ("IGBT")-based DC/DC converter may be required. However, IGBT (or similar) DC/DC converters may be have certain drawbacks in this application. In particular, with DC/DC converters, the greater the ratio that the voltage is bucked or boosted, the greater the need for fast switching. However, IGBT's dissipate heat and emit electronic noise at high switching frequencies. Heat is inherently lossy and also diminishes IGBT performance, and noise may affect other drive system and/or vehicle components.

In a heavy duty hybrid application, these challenges may more pronounced. For example, in a heavy duty HEV having a battery-based energy storage, a DC/DC converter may need to convert voltage across a step from a low SOC of 200 VDC to a high SOC of 700 VDC; and where it has an ultracapacitor-based energy storage, the DC/DC may need to boost voltage from a nominal (~0 VDC) voltage up to 700 VDC. Thus, at low SOC of the energy storage, the voltage step is substantial, and undesirable losses and noise are introduced into the HEV drive 100. To overcome some of these deficiencies active cooling, electronic noise reduction, etc. may be used. Thus, in current hybrid drive systems having a single stage DC propulsion power bus, to meet these high voltage ratio and propulsion power requirements, expensive, high performance equipment may be required.

With regard to control and power flow management, a control unit (not shown) may be further provided to control access to bus 150. In various configurations, each energy source/subsystem may be switchably coupled to or uncoupled from bus 150. It is contemplated that interface elements 116, 126, 136 may include independent switches or may utilize switching functionality already present in AC/DC converters and DC/DC converters. In these embodiments, the control unit may operate the various interface elements. The control unit may be, for example, a single comprehensive controller, such as an electric vehicle control unit (EVCU), a local drive system controller, such as drive interface controller (DIGO), or some combination thereof.

From time-to-time, the present disclosure is described herein in terms of this example environment. Description in terms of this environment is provided to allow the various features and embodiments of the disclosure to be portrayed in the context of an exemplary application. After reading this description, it will become apparent to one of ordinary skill in the art how the disclosure can be implemented in different and alternative environments.

Figure 2:
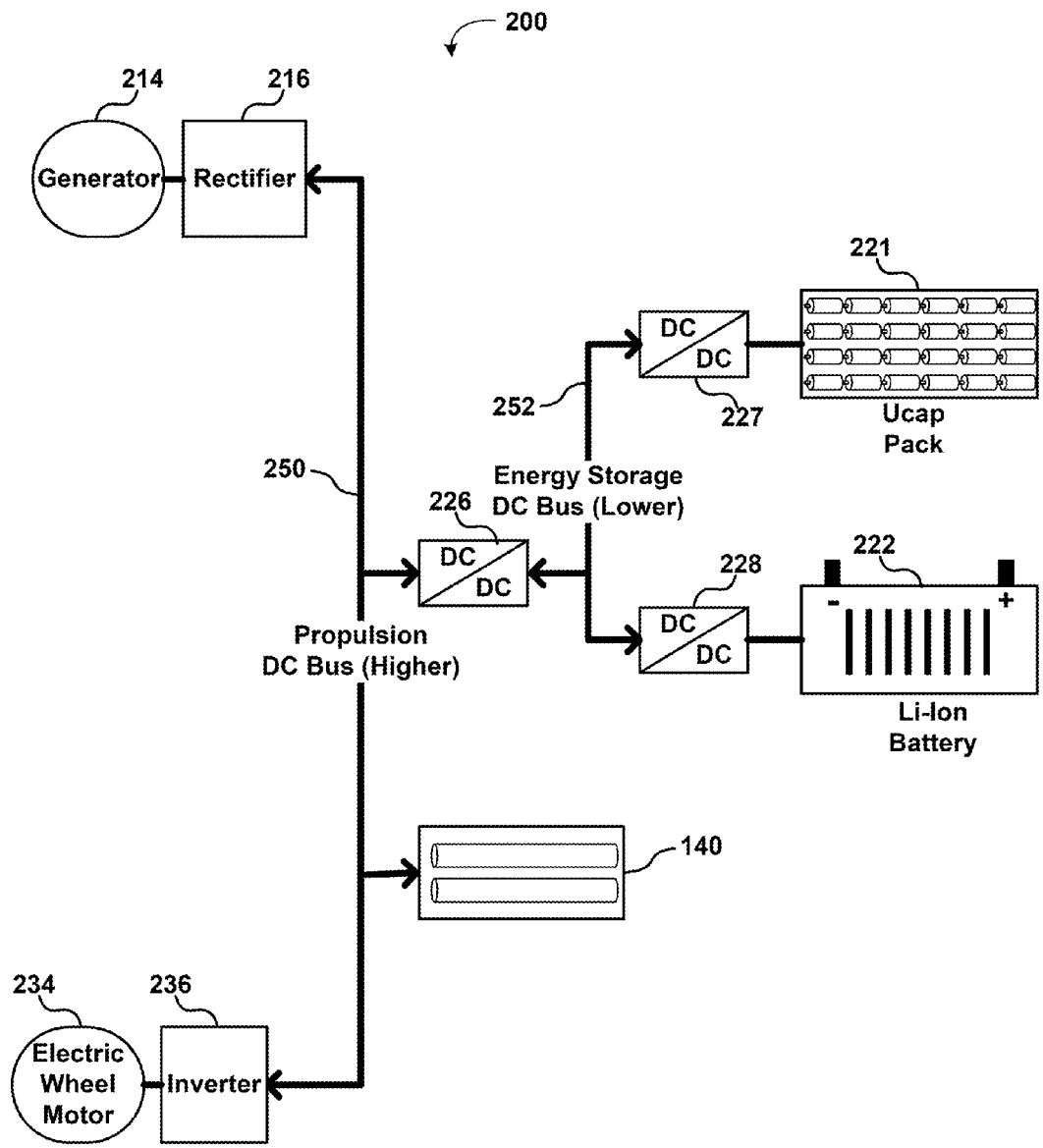
FIG. 2 illustrates a diagram of a power transmission system for a hybrid electric vehicle drive system according to an embodiment of the disclosure.

Referring now to FIG. 2, a system architecture implemented in accordance with an embodiment of the disclosure is depicted. As above, a first power bus 250 or propulsion DC bus provides a common medium for power transmission between different subsystems of HEV drive system 200. In particular, in the illustrated embodiment, motive power for the HEV is primarily provided by an electrical generator 214 powered by an internal combustion engine (not shown). This internal combustion engine and generator combination produces an AC electrical current that is converted into DC current using rectifier 216, providing for transmission to other system components on bus 250. In addition, the vehicle may be driven completely or partially by energy stored in its energy storage 221, 222, which is connected to DC bus 250 via a DC/DC converter 226. Furthermore, power may be recuperated and transmitted over DC bus 250 by a propulsion electric motor 234, which serves as a generator during regen operations, and which is connected to DC bus 250 via an inverter/rectifier 236. In these embodiments, the first bus 250 can also be maintained at a predetermined voltage, or in some embodiments at a number of different predetermined voltages. For example, in a heavy duty vehicle, the first bus 250 may be maintained at one or more predetermined voltages on the order of 650 VDC to 700 VDC.

Instead of merely using a single DC power bus for the HEV drive system 200 (e.g., propulsion bus 250), as existing systems do, the illustrated embodiment breaks the HEV drive system's DC power into stages via multiple buses. Preferably, a dual-bus architecture is employed, as illustrated. As described above, a first bus 250 provides a common medium for power transmission among motive energy, propulsion, and storage subsystems; however, a second bus 252 energy storage bus provides a common medium for energy transmission between a plurality of propulsion energy storage subsystems 221, 222, the energy transmission being independent of and prior to its delivery to the primary propulsion bus 250. Here, HEV drive system 200 provides energy storage DC bus 252 as a single node for the drive system 200 to access its energy storage. Also, second bus 252 may provide a common medium for power transmission among other components/accessories of the HEV drive system.

Importantly, the second bus 252 is maintained at lower voltage level than first bus 250. The "low" DC bus voltage may be on the order of one half the voltage of the "high" DC bus, and generally, the "low" DC bus voltage will fall within the range of 25% to 75% of the "high" DC bus voltage. In the illustrated two-level DC bus architecture, the voltage level of the "high" DC bus may correspond to the propulsion/traction motor voltage rating, and the voltage level of the "low" DC bus may correspond to the voltage rating of the energy storage and/or other HEV subsystems. For example, according to one embodiment including a heavy duty hybrid vehicle, propulsion bus 250 may maintained between 650-700 VDC, which may correspond to the voltage rating of electric motor 234 and energy storage bus 252 may be maintained between 300-400 VDC, which may correspond to the voltage ratings of energy storage subsystems 221, 222.

In some embodiments, the energy storage DC bus 252 may be maintained in a predetermined electrical state such that disparate energy storage subsystems may all connect to it and distribute energy among each other or "blend". In these embodiments, various converters may be employed at the interfaces between the energy storage subsystems and the bus 252 to convert energy to the commonly used form. For example, in the illustrated embodiment, which employs an ultracapacitor system 221 and a battery system 222, bus 252 may be configured to provide DC current electricity to connected devices at a predetermined voltage. In a particular embodiment, the bus 252 is maintained at 350 VDC.

Energy storage DC bus 252 facilitates the use of a parallel, modular energy storage architecture; moreover, in some embodiments and as discussed above, an HEV drive system 200 may employ different types of propulsion energy storage subsystems in the same vehicle. In particular, the illustrated embodiment employs both a power-type energy storage subsystem/module 221 and an energy-type energy storage subsystem/module 222. In this embodiment, power-type energy storage subsystem 221 may comprise one or more ultracapacitor packs, wherein a pack comprises a plurality ultracapacitor cells electrically coupled together to provide a common storage system. Likewise, in this embodiment, energy-type energy storage subsystem 222 may comprise one or more rechargeable batteries coupled together to provide a common energy storage system. Preferably, the battery system 222 is matched with at least one equivalent voltage ultracapacitor system 221.

Furthermore, the different types of energy storage subsystems may each vary in their characteristics to meet certain HEV drive system performance requirements, while not needing to meet others. In particular, the different energy storage modules may be selected, sized, and combined such that together they meet the vehicle's overall desired performance, while overcoming each other potential limitations. For example, ultracapacitor system 221 may selected to be capable of supplying sufficient wattage to fully power the HEV's electric traction/propulsion motor 234, even from a stand still and up a steep hill, while not needing to be capable of storing sufficient energy to power the vehicle for extended periods. On the other hand, a battery system 222 may be capable of storing sufficient energy to power the vehicle for extended periods in situations requiring only low power, such as coasting, but may not be capable of supplying sufficient power to fully propel the vehicle in high power situations. Furthermore, an ultracapacitor system 221 may be capable of receiving and storing all or most of the energy produced during a regen period, but this may cause it to reach its full capacity such that it cannot store the energy from a second regen period. On the other hand, a battery system 222 may be capable of storing the energy from multiple regen periods, but may not be capable of receiving all of the power produced during a single regen period.

As illustrated, to allow power transfer between the second bus 252 and the first bus 250, a bus-to-bus DC/DC converter 226 may be provided, forming the interface between the two buses. Accordingly, energy storage DC bus 252 is electrically coupled to the propulsion DC bus via DC/DC converter 226, which lifts current flowing from the energy storage bus 252 to that of the propulsion bus 250 and lowers current flowing from the propulsion bus 250 to that of the energy storage bus 252, depending on the direction of energy flow. According to one embodiment (e.g., where propulsion bus 250 is maintained between 650-700 VDC), DC/DC converter 226 is preferably a high power, insulated-gate bipolar transistor ("IGBT")-based DC/DC converter.

Similarly, to allow energy transfer from the energy storage subsystems 221, 222 on second bus 252, one or more devices 227, 228 operable to electrically couple/decouple energy storage subsystems 221, 222 and/or to convert DC voltage may be provided, forming the interface between the energy storage and the bus 252. Devices 227, 228 are preferably embodied as controllable DC/DC converters that are configured to bidirectionally step up and step down voltage. Moreover, as illustrated, each of the ultracapacitor system 221 and the battery system 222 will preferably have its own DC/DC converter 227, 228. The actual number of DC/DC converters will be dictated by cost and redundancy required in the system. Here, there are only two energy storage subsystems 221, 222, the minimum; however, where there are multiple ultracapacitor modules (e.g., see FIG. 4), additional DC/DC converters (i.e., one for each module) may be advantageous. Alternately, the multiple ultracapacitor modules may be electrically coupled in parallel with a single DC/DC converter between their common node and the energy storage bus 252 (not shown). This embodiment reflects the similar charging/discharging rates and characteristics of the ultracapacitors with each other, which is substantially different from that of the battery.

In either case, each energy storage DC/DC converter may be configured to boost and buck voltages to or from their respective energy storage subsystem such that power from ultracapacitor system 221 and the battery system 222 is consistently provided on the DC bus 252 at a stable predetermined voltage. Given that ultracapacitors may be completely discharged without degradation, the ultracapacitor DC/DC converter 227 will generally need to operate over a larger voltage range than the battery DC/DC converter 228. For example, with an ultracapacitor energy storage subsystem 221 that has a voltage rating on the order of 350 VDC, the ultracapacitor DC/DC converter 227 may need to convert voltages varying from 350 VDC to almost 0 VDC during normal vehicle operation, whereas the battery DC/DC converter may only require conversion in the 100 VDC-350 VDC range.

With dedicated DC/DC converters 227, 228, energy storage DC bus 252 electrically couples both ultracapacitor system 221 and battery system 222 together, in such a way that energy from each may then be "blended", as needed to meet the HEV's power and energy demands. In addition, DC bus 252 and DC/DC converters 227, 228 provide for each energy storage subsystem to be selected independently or in combination for a particular drive cycle demand, thus leveraging the strengths of ultracapacitor system 221 and battery system 222 against each other's deficiencies.

In operation, DC/DC converters 227, 228 will generally serve to boost voltages to and from each energy storage 221, 222. In particular, each DC/DC converter 227, 228 may operate to raise the voltage of the energy storage bus 252 and to charge/discharge each energy storage 221, 222, respectively. In addition, the multiple energy storage subsystems are configured to transfer power among themselves via their shared DC bus 252. In further embodiments, energy DC bus 252 is also configured to allow the different energy storage subsystems 221, 222 to contribute different amounts of energy in response to a demand from drive system 200, and to allow the HEV to selectively distribute any incoming energy between energy storage subsystems. For example, in the illustrated embodiment, (1) power may be transferred from the ultracapacitor system 221 to the battery system 222 or the electric wheel motor 234; (2) power may be transferred from the battery system 222 to the ultracapacitor system 221 or the electric wheel motor 234; (3) power may be transferred from the generator 214 to the ultracapacitor system 221, the battery system 222, and/or the electric wheel motor 234; and, during regen, (4) power may be transferred from the electric wheel motor 234 to the ultracapacitor system 221 and/or the battery system 222. The above is not intended as an exhaustive list, but rather to illustrate many degrees of freedom with regard to power flow and control.

According to one embodiment, the energy storage DC/DC converters 227, 228 operating autonomously from the propulsion DC Bus 250, may "shuffle" current between the power-type (e.g., ultracapacitor-based) and energy-type (e.g., battery-based) energy storages 221, 222. Thus, each energy storage 221, 222 may be operated according to its relative response time, yet still meet the needs of the vehicle. In particular, the ultracapacitor 221 may be configured to be "immediately" responsive to power requirements of the vehicle (e.g. acceleration or braking), followed by a "slower" response by the battery 222 (e.g., discharging to or charging up the ucap). For example, following an acceleration event, leaving discharged ultracapacitor system 221, the battery system DC/DC converter 228 may lift the DC bus 252 to voltage, and "recharge" the ultracapacitor system 221 for another acceleration event. In similar fashion, the DC/DC converters 227, 228 may operate together to balance out the overall energy storage state of charge (SOC) under various different load conditions. Advantageously, by using DC/DC conversion to balance the ultracapacitor system 221 and the battery system 222, the useful life of battery system 222 (e.g., Li-Ion based) can be extended as battery system 222 may be insulated from high power demands/spikes and may maintain a more stable SOC.

This ability to actively shuffle current between the ultracapacitors and batteries at different voltages/SOCs provides for more aggressive energy storage strategies and increased performance. For example, according to one embodiment, anticipatory SOC control (e.g. using GPS) can easily be adopted into this scheme, due to the energy storage operational independence, and provide the correct power/energy delivery to conclude improved vehicle efficiency. This is particularly useful in HEVs using Start-Stop/Idle-Stop engine control. In addition, actively shuffling reduces the need to "overdesign" the vehicle's energy storage to meet customer performance requirements (e.g., ultracapacitors designed to meet energy requirements or batteries designed to meet power requirements). Thus, the combination of the discrete lower voltage energy storage DC bus 252 and the independent energy storage DC/DC converters 227, 228 leverages energy storage technologies so that a much leaner and efficient HEV energy storage can be used, while still meeting the requirements typical of a HEV drive cycle.

Although this dual-bus "blended" architecture does require the addition of two DC/DC converters between each energy storage subsystem and the energy storage bus 250, increasing system complexity and cost, benefits associated with this architecture may still result in improved performance and overall reduced cost. In particular, DC/DC converters can be expensive components, depending on parameters such as: operating voltage, voltage conversion ratio, and required voltage stability. Here, the ability to step up to or step down from an intermediate voltage (instead of full voltage) may reduce the device complexity/cost associated with using a higher voltage/higher step DC/DC converters (as discussed above). Thus, by having multiple DC buses, the boost (and buck) ratio is decreased, and lower-cost DC/DC converters may be used. Accordingly, in some embodiments, the intermediate voltage at which the bus 252 is maintained may allow for the use of less complex or expensive DC/DC converters.

Since energy storage bus 252 is maintained at a voltage significantly below the voltage of the propulsion bus 250, DC/DC converters may advantageously be segmented by technology. In particular, the converter 226 on the higher voltage bus 250 may utilize a different technology than the converters 227, 228 on the lower voltage bus 252. Generally, the selection of converter technology will be driven by semiconductor economics and the boost/buck voltages. For example, field-effect transistor or metal-oxide-semiconductor field-effect transistor (FET or MOSFET)-based DC/DC converters may be employed on the lower bus 252 rather than using expensive IGBT-based DC/DC converters. Although MOSFETs are rated for lower voltages than IGBTs, they may operate at much higher frequencies (e.g. >200 kHz) with greater efficiencies.

According to one preferable embodiment, each ultracapacitor system 221 and battery system 222 will have its own MOSFET-based DC/DC converter 227, 228, configured to both maintain a stable, predetermined voltage on energy storage bus 252 and to balance energy between each other. Meanwhile, the DC/DC converter between the energy storage bus 252 and the propulsion DC bus 250 will be an IGBT-based DC/DC converter. In this preferred embodiment, the segmentation of the IGBT and MOSFET DC/DC converters still allows both levels to operate independently, and the converters at the lower level can be controlled to balance the state of charge, SOC, power and energy source in readiness for the recuperation of regenerative energy from either the intermediate DC-Bus, or the upper high-voltage bus, or a combination of both.

As an additional benefit, this dual-bus configuration advantageously provides for the allotment of lower rated converters 227, 228 to be used where there is the greatest voltage instability (i.e., the low DC bus 252) and a higher rated converter 226 to be used where there is less voltage instability (high DC bus 250). In particular and as discussed above, energy storage DC/DC converters 227, 228 regulate the intermediate DC bus 252 according to a continually varying energy storage SOC, and bus-to-bus DC/DC converter 226 regulates the voltage between two relatively stable predetermined voltages set for each bus 250, 252. As discussed above, field effect transistor-based technology may be used in the lower voltage bus and IGBTs may be used in the higher voltage bus. Furthermore, various electric signal characteristics that are introduced in large step DC/DC converters may be avoided through the use of the intermediate bus 252. In some embodiments, this can reduce various harmful electrical characteristics present in large ratio DC/DC converters. For example, this architecture may reduce ripple current that can degrade interconnects through heating effects and improve IGBT efficiency by operating at lower frequencies. Also for example, in the lower voltage portion, MOSFET DC/DC converters provide a more refined control with lower ripple current and heat, provide higher power quality, and emit less noise.

Figure 3:
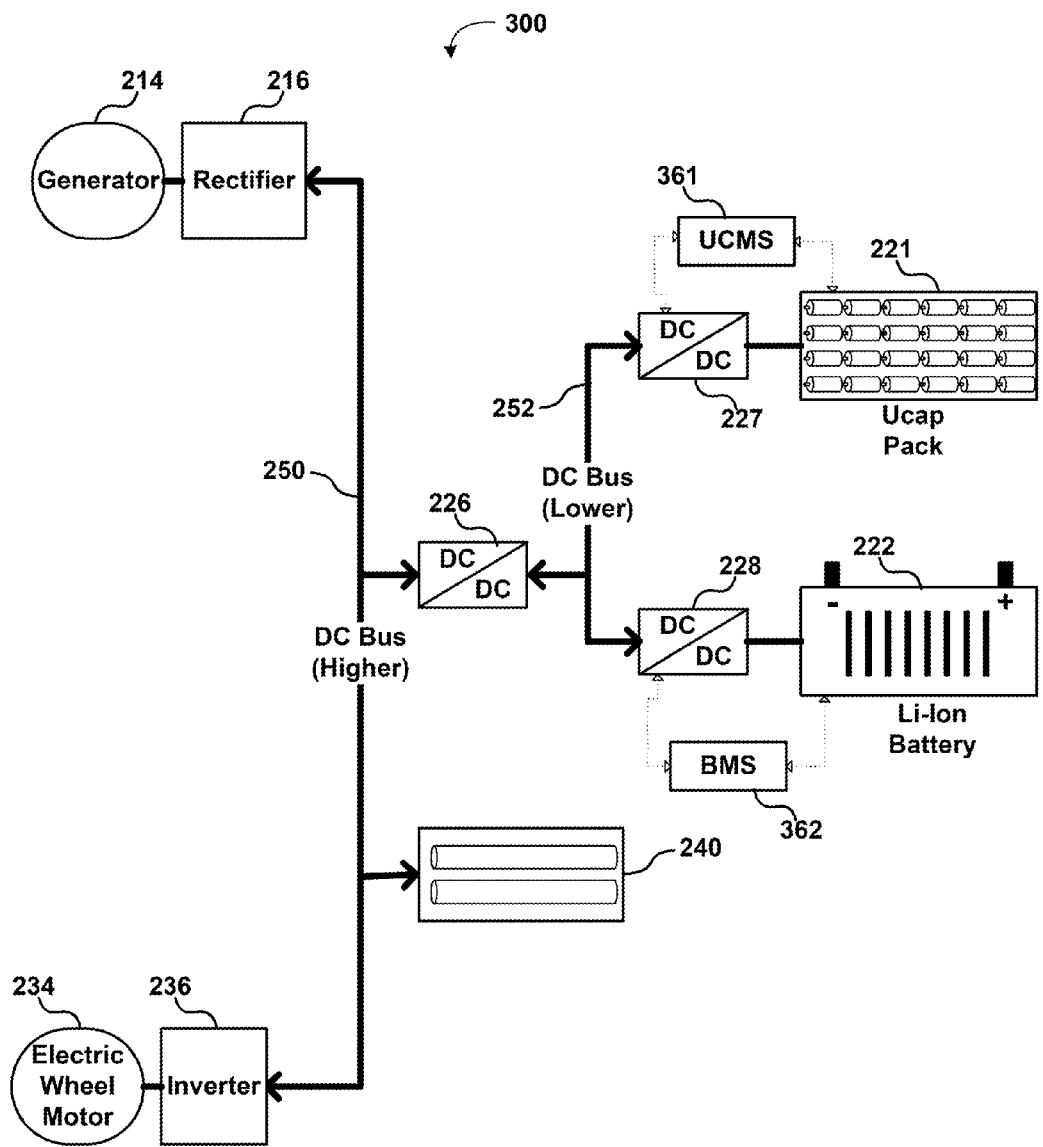
FIG. 3 illustrates a diagram of a power transmission system including control management systems for a hybrid electric vehicle drive system according to an embodiment of the disclosure.

FIG. 3 illustrates a more detailed diagram of the embodiment illustrated in FIG. 2. In this figure, like reference numbers refer to like elements described above. FIG. 3 shows HEV drive system 300 further illustrating an ultracapacitor management system ("UCMS") or module 361 communicably coupled to the ultracapacitor energy storage subsystem 221 and/or DC/DC converter 227, and a battery management system ("BMS") or module 362 communicably coupled to battery energy storage subsystem 222 and/or DC/DC converter 228. In addition, UCMS 361 and BMS 362 may be communicable coupled to each other and/or a common controller (discussed below).

The proposed multi-bus architecture provides for far greater strategic control of the HEV's energy storage, and as such, each subsystem HEV's energy storage may be coordinated to provide greater efficiency and performance. Generally, the energy storage management systems 361 and 362 may be configured to control whether energy can be stored in or removed from their respective storage subsystem, and if so, at what energy transfer rate. In particular, power and energy may be balanced according to which portion of the drive cycle the HEV is in. For example, at the start of vehicle acceleration, the energy storage management systems 361 and 362 operate to draw 80% from ultracapacitor energy storage subsystem 221 and only 20% from battery energy storage subsystem 222. Then during cruise, the energy storage management systems 361 and 362 may reconfigure the energy storage subsystems such that 20% is drawn from ultracapacitor energy storage subsystem 221 and now 80% is drawn from battery energy storage subsystem 222. It is understood that these percentages are for illustration purposed and that the energy storage subsystems may be balanced across a continuum of values, depending on the condition of the vehicle and drive system 300.

As another example, a coasting vehicle may be entirely driven using energy from the battery subsystem 222. In this situation, the ultracapacitor management system 361 may be configured to decouple the ultracapacitor storage energy 221 from the bus 252 altogether, and the battery management system 362 may be configured to couple the battery energy storage subsystem 222 to the bus 252 and allow the battery energy storage subsystem 222 to provide its maximum power. In this example, if the coasting vehicle encounters a hill or other situation requiring more power than the battery system 222 is capable of providing, the ultracapacitor management system 361 may be configured to recouple the ultracapacitor subsystem 221 to the bus 252 to meet any extra power requirements. If the high-power situation continues after the ultracapacitor storage 221 has been depleted, then the generator 214 may be started to continue meeting the extra power requirements. Accordingly, in these examples, fuel may be saved even in situations that would normally require operating the vehicle engine because the power needs of the HEV drive system 300 may be at least partially met by the ultracapacitor subsystem 221 by virtue of its large power density. In further embodiments, energy from the battery energy storage subsystem 222 may be intermittently shuffled back to the ultracapacitor energy storage subsystem 221, or excess energy from the generator 214 may be transferred to the ultracapacitor energy storage subsystem 221, to allow the ultracapacitor energy storage subsystem 221 to be precharged in anticipation of more such high power requiring situations.

According to one embodiment, the ultracapacitor energy storage 221 may be configured to act as a buffering system for the battery energy storage subsystem 222. For example, if the battery system 222 cannot charge fast enough to receive the wattage provided from the generator 214 during engine operation, or the electric wheel motor 234 during regen, the ultracapacitor system 221 may be configured to receive the excess energy. In this embodiment, once energy is done being stored, for example after a braking period or when the vehicle is being driven entirely by generator 214, the ultracapacitor system 221 may continue to provide the excess stored energy to the battery system 222 at a rate conditioned to meet the battery system's charging capabilities.

In addition to energy distribution and power control, UCMS 361 and BMS 362 may perform additional functions. In particular, UCMS 361 and BMS 362 may provide processing, control, and/or sensory information to their respective energy storage subsystem 221, 222 and/or other components/subsystem of the drive system 300. For example, UCMS 361 and BMS 362 may monitor and report on temperature, electrical isolation, and voltage conditions of their respective modules. In addition, UCMS 361 and BMS 362 may operate module cooling, fire protection, cell balancing, etc. UCMS 361 and BMS 362 may also operate directly or indirectly DC/DC converters 227, 228; moreover, according to one embodiment, UCMS 361 and BMS 362 may have sufficient control of DC/DC converters 227, 228 to operate their switching to electrically decouple their respective energy storage subsystems 221, 222 from DC bus 252.

Figure 4:
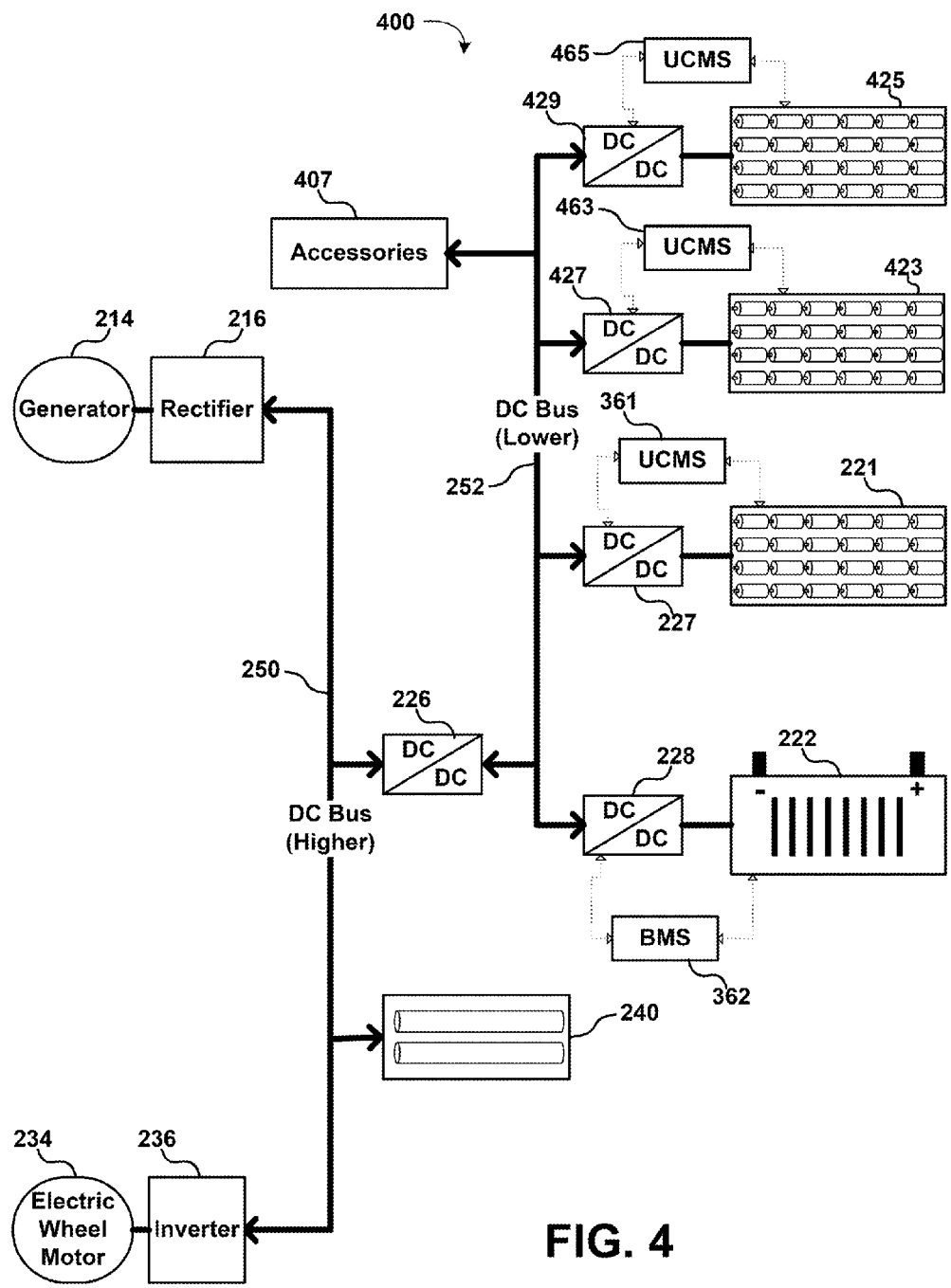
FIG. 4 illustrates a diagram of a power transmission system including multiple energy storage systems for a hybrid electric vehicle drive system according to an embodiment of the disclosure.

Referring now to FIG. 4, a further HEV drive system 400 is illustrated according to an embodiment of the disclosure. In this diagram, similar reference numbers are used for equivalent elements described with respect to FIGS. 2 and 3. This figure illustrates that multiple energy storage subsystems/modules can be employed in various embodiments of the disclosure. In the illustrated embodiment, a plurality of ultracapacitor energy storage subsystems 221, 423, and 425 are connected to bus 252. Each of the energy storage subsystems is also coupled to a management system, 361, 463, and 465, respectively, and is coupled to a DC/DC converter 227, 427, and 429, respectively.

These multiple energy storage subsystems may be employed in various manners in addition to those discussed above. In particular, the separation and controllability of the ultracapacitor energy storage subsystems 221, 423, and 425 allows each to be used for separate duties or in combination. According to one embodiment, ultracapacitor energy storage subsystems 221, 423, 425 may be operated as, effectively, one larger capacity ultracapacitor energy storage subsystem. According to another embodiment, the different ultracapacitor energy storage subsystems may be used for different purposes. For example, ultracapacitor energy storage subsystems 221 and 423 may be specially configured for balancing SOC between battery 221, while ultracapacitor energy storage subsystem 425 may be specially configured to only receive the charge during regen periods, and distribute that received charge to the other energy storage subsystems during idling or other free time. Also for example, ultracapacitor 221 may be dedicated to SOC balancing and/or other support to battery 222, while ultracapacitor 423 is dedicated to regen energy capture (i.e. normally maintained at a low SOC), and ultracapacitor 425 is dedicated to HEV acceleration (i.e. normally maintained at a high SOC). According to another embodiment, ultracapacitor energy storage subsystems 221, 423, 425 may be dynamically reconfigured such that during one section of the drive cycle they are configured to operate according a first profile and at another section of the drive cycle they are configured to operate according to a second profile that is better suited to that section of the drive cycle. The above embodiments are not intended as an exhaustive list, but rather to illustrate that the multiple energy storage subsystems may be used in a variety of ways.

As further illustrated in FIG. 4, various vehicle electrical accessories 407 may also be coupled to bus 252. Such accessories 407 might comprise, for example, vehicle lighting, air-conditioning units, heaters, power steering, air compressors, and other electrically powered vehicle components. In some embodiments, coupling the accessories 407 to the intermediate energy storage DC bus 252 allows the traction system components (i.e., generator 214 and electric wheel motor 234) to be isolated from electrically-driven accessories that might otherwise interrupt or interfere with power reserved for propelling the HEV. Furthermore, many vehicle accessories may be configured to operate at voltages that are closer to the voltage of bus 252 than that of bus 250. Accordingly, accessories 407 may be operated directly without bucking down the propulsion bus voltage. Where electrical accessories 407 still require DC conversion from the energy storage bus 252, by converting DC current from bus 252, rather than that of propulsion bus 250, a smaller conversion ratio is required, thereby allowing less-expensive or less complex components to perform conversion to operate the accessories. In addition, where electrical accessories are powered off the intermediate energy storage bus 252, it may be advantageous to set its bus voltage according to the accessories instead of the energy storage, and merely operate the energy storage DC/DC converters 227, 228, 427, 429 to meet the set voltage.

Figure 5:
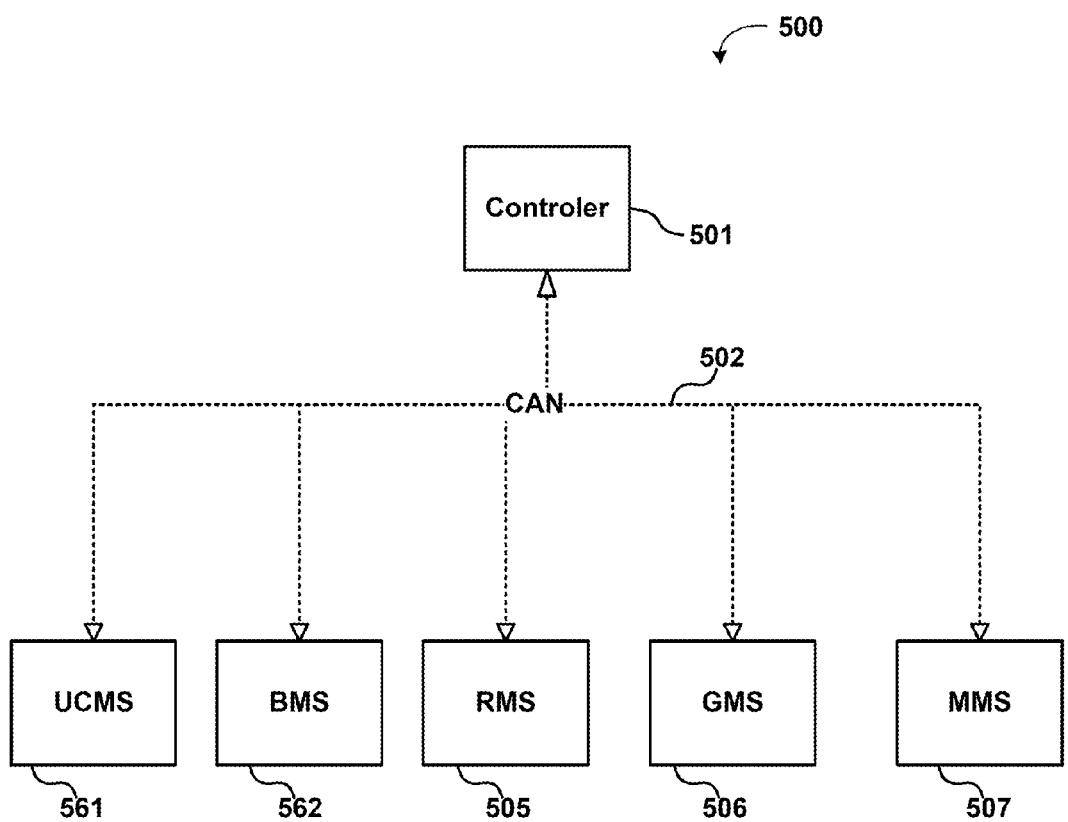
FIG. 5 illustrates an example system control network that may be deployed for controlling a hybrid electric vehicle drive system in accordance with an embodiment of the disclosure.

Referring now to FIG. 5, an example control system 500 is illustrated that may be used to control system operations in some embodiments of the disclosure. Control system 500 may include a control unit or system controller 501 and one or more management modules. The management modules/systems may be wholly or partially integrated in controller 501. Control unit 501 and its management systems may form a discrete unit or be integrated in one or more host devices. For example control unit 501 may form part of an electric vehicle control unit (EVCU), a drive interface controller (DICO), an energy storage controller, etc. In addition, control unit 501 may be embodied as hardware, software, or a combination of both. The controller 501 and its associated management modules/systems may span multiple hybrid drive subsystems for coordinated control of energy flow.

Where the various management modules are physically separated, they will preferably be communicatively coupled to each other, and may communicate with each other via a proprietary communication protocol and/or a standardized communication protocol. In the depicted embodiment, control unit 501 is coupled to a plurality of separate management systems via a controller area network 502. In the illustrated network, elements of the plurality of control management systems comprise an ultracapacitor management system 561, a battery management system 562, a routing management system 505, a generator management system 506, and an electric motor management system 507. Such control systems may be configured to allow the drive system to perform various power transmission and storage operations. In particular, control unit 501 may be configured to selectably route power flows between motive energy subsystem, the electric motor(s), the battery energy storage subsystem(s), and the ultracapacitor energy storage subsystem(s). It is understood that these listed management modules/systems are not intended to be limiting, but rather to illustrate the need for interaction and cooperation between various hybrid drive subsystems of the HEV.

In one embodiment, control unit 501 may perform routing management using a routing management subsystem coupled to the various DC/DC converters, or coupled to switches that allow selectable coupling of the various power systems to their respective buses. For example, this routing management may allow the system to form a circuit between the electric generator, the electric motor, and one or more of the energy storage subsystems, such that the electric motor (and hence the vehicle) are propelled by a combination of power from the electric generator and the electric energy storage subsystems.

Controller 501 may further cause the UCMS 561 or the BMS 562 to meter the amounts of power provided by these systems such that any energy providing system may contribute to propulsion in varying degrees or unequal amounts. For example, the system may be configured such that the power on propulsion DC bus is blended such that the engine provides 60% of the power required for vehicle propulsion, the ultracapacitor provides 30% of the power required for vehicle propulsion, and the battery system provides the remaining 10%.

In further embodiments, the control unit 501 may cause the system to distribute power between the battery energy storage subsystems and ultracapacitor energy storage subsystems, as described above. In still further embodiments, the control unit 501 may be configured to allow the vehicle to operate in one of a plurality of different operation modes. For example, (1) in a Generator-only mode, the internal combustion engine and electric generator may provide enough power to operate the electric motor of the propulsion system; (2) in a Power-assist mode, the intermediate bus and electric energy storage subsystems may be configured to contribute power to the operation of the electric motor; (3) in an electric vehicle ("EV") mode, the intermediate bus and electric energy storage subsystems may be configured to provide sufficient power to completely operate the electric motor; and (4) in a Regen mode, the electric motor may operate as an electric generator during regenerative braking to provide power to one or more of the electric energy storage subsystems.

In further embodiments, the use of the intermediate bus coupled to the plurality of electric energy storage subsystems allows certain operations are performed independently of propelling the vehicle. For example, the controller 501 may electrically decouple the intermediate bus from the propulsion power bus, so that energy may be distributed between the various energy storage subsystems (such as from an ultracapacitor used to buffer regenerative braking power to a battery). For example, during periods of vehicle propulsion (i.e., where power is applied across the propulsion DC bus to the electric motor), controller may open the bus-to-bus DC/DC converter and operate the dedicated energy storage DC/DC converters such that energy may flow between the battery energy storage subsystem and the ultracapacitor energy storage subsystem. In alternative embodiments, the various energy management systems 561, 562, 505, 506, 507 may comprise software modules of a central control unit 501, or their functionalities may be performed by other control systems or modules of the vehicle, for example as described below.

Figure 6:
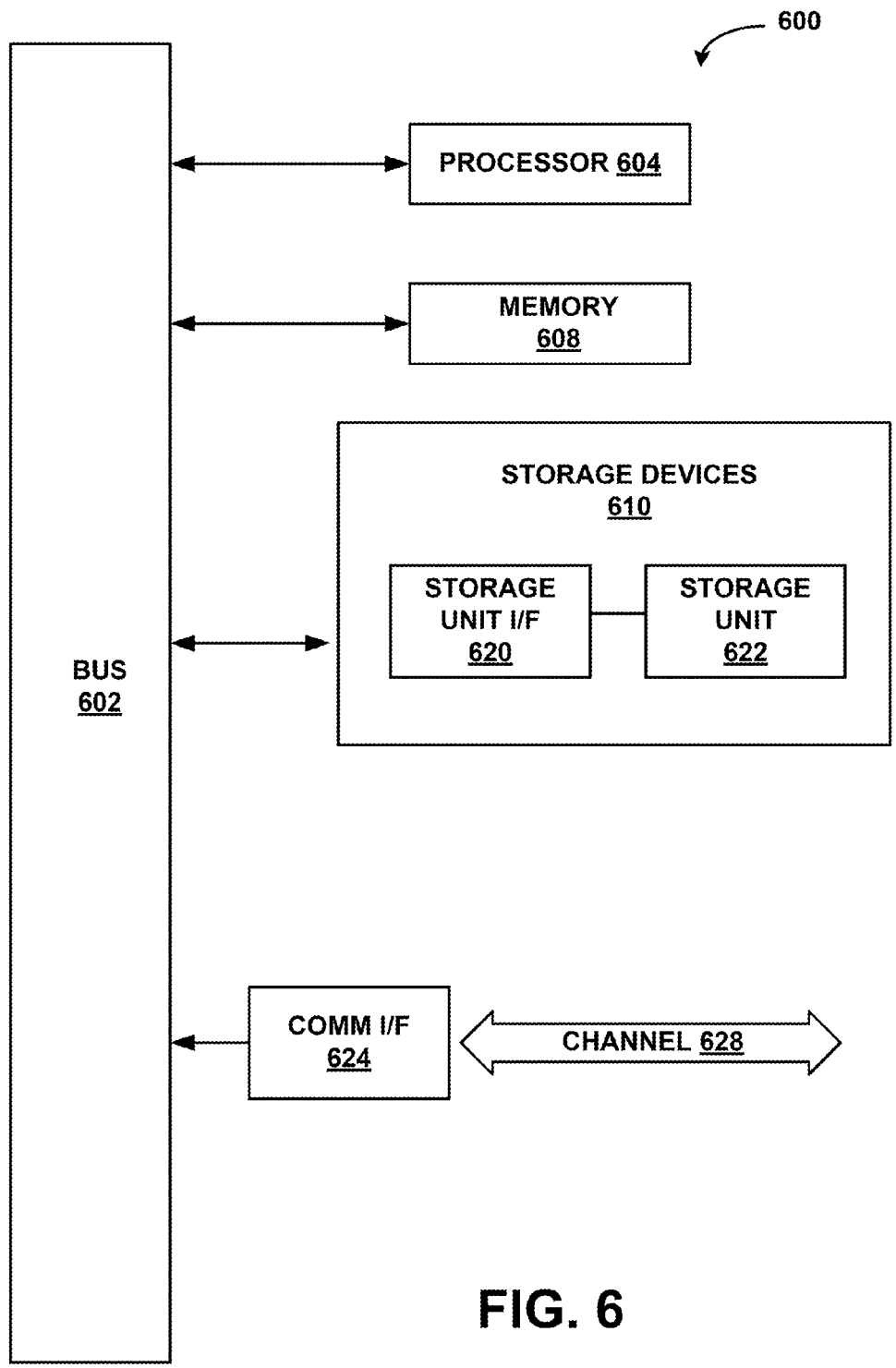
FIG. 6 illustrates an exemplary computing module with which various features of some embodiments of the disclosure may be implemented.

In some embodiments, various systems operations described herein may be performed by a system controller comprising a computing module. For example, one such computing module is shown in FIG. 6. Various embodiments are described in terms of this example-computing module 600. After reading this description, it will become apparent to a person skilled in the relevant art how to implement the disclosure using other computing modules or architectures. Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a communications bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to communications bus 602 for storing static information and instructions for processor 604.

The computing module 600 might also include one or more various forms of information storage mechanism 610, which might include, for example, a storage unit interface 620. Examples of such storage units 622 and interfaces 620 can include: a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a CAN bus, a cellular link, an RF link, an optical link, a network interface, and other wired or wireless communications channels.

In this document, the terms "computer program medium" and "computer usable medium" are used to generally refer to media such as, for example, memory 608, storage unit 622, and signals on channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present disclosure as discussed herein.

As used herein, the term module might describe a given unit of functionality that can be performed in accordance with one or more embodiments of the present disclosure. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements. Accordingly, such description shall not require or imply that separate hardware or software components are used to implement such features or functionality.

While various embodiments of the present invention have been described above, it should be understood that they have been presented by way of example only, and not of limitation. Likewise, the various diagrams may depict an example architectural or other configuration for the disclosure, which is done to aid in understanding the features and functionality that can be included in the disclosure. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. In addition, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A hybrid electric vehicle drive system, comprising:
    a motive energy subsystem;
    a drive wheel propulsion assembly including at least one electric motor, the at least motor configured to drive the drive wheel propulsion assembly;
    a first propulsion energy storage subsystem;
    a second propulsion energy storage subsystem;
    an energy storage DC bus electrically coupled to the first propulsion energy storage subsystem and the second propulsion energy storage subsystem, and configured transmit energy among the first propulsion energy storage subsystem and the second propulsion energy storage subsystem;
    a first energy storage DC-to-DC converter interspersed between the first propulsion energy storage subsystem and the energy storage DC bus;
    a second energy storage DC-to-DC converter interspersed between the second propulsion energy storage subsystem and the energy storage DC bus;
    a propulsion DC bus configured to transmit energy among the motive energy subsystem, the drive wheel propulsion assembly, and the energy storage DC; and,
    a bus-to-bus DC-to-DC converter interspersed between the energy storage DC bus and the propulsion DC bus.

2. The hybrid electric vehicle drive system of claim 1, wherein the propulsion DC bus transmits energy at a first predetermined voltage; and,
    wherein the energy storage DC bus transmits energy at a second predetermined voltage that is lower than the first predetermined voltage.

3. The hybrid electric vehicle drive system of claim 2, wherein the second predetermined voltage is between 25% and 75% of the first predetermined voltage.

4. The hybrid electric vehicle drive system of claim 3, wherein the first predetermined voltage corresponds with a propulsion voltage rating of the at least one electric motor; and,
    wherein the second predetermined voltage corresponds with an energy storage voltage rating of the first propulsion energy storage subsystem.

5. The hybrid electric vehicle drive system of claim 1, wherein the first propulsion energy storage subsystem comprises at least one energy-type energy storage subsystem;

wherein the second propulsion energy storage subsystem comprises at least one power-type energy storage subsystem;

wherein the at least one energy-type energy storage device is rated to store at least 3000% energy of the at least one power-type energy storage device used here; and, wherein the at least one power-type energy storage device used here is rated to deliver at least 300% power of the at least one energy-type energy storage device.

6. The hybrid electric vehicle drive system of claim 1, wherein the first propulsion energy storage subsystem comprises a battery energy storage subsystem; and, wherein the second propulsion energy storage subsystem comprises a first ultracapacitor energy storage subsystem.

7. The hybrid electric vehicle drive system of claim 6, further comprising:

a battery management system communicably coupled to the battery energy storage subsystem and the first energy storage DC-to-DC converter, the battery management system configured to control whether energy can be stored in or removed from the battery energy storage subsystem, and if so, at what energy transfer rate.

a ultracapacitor management system communicably coupled to the first ultracapacitor energy storage subsystem and the second energy storage DC-to-DC converter, the ultracapacitor management system configured to control whether energy can be stored in or removed from the first ultracapacitor energy storage subsystem, and if so, at what energy transfer rate.

8. The hybrid electric vehicle drive system of claim 7, further comprising a system controller communicatively coupled to the battery management system and the ultracapacitor management system, the system controller configured to selectably route power flows between the motive energy subsystem, the electric motor, the battery energy storage subsystem, and the first ultracapacitor energy storage subsystem; and, wherein the controller is further configured to meter energy from the battery energy storage subsystem and the ultracapacitor management system in equal and/or unequal amounts to the propulsion DC bus across the energy storage DC bus.

9. The hybrid electric vehicle drive system of claim 7, further comprising a system controller communicatively coupled to the battery management system and the ultracapacitor management system, the system controller configured to selectably route power flows between the motive energy subsystem, the electric motor, the battery energy storage subsystem, and the first ultracapacitor energy storage subsystem; and, wherein the controller is further configured to electrically couple and decouple the energy storage DC bus from the propulsion DC bus such that power may flow across both the energy storage DC bus and the propulsion DC bus independently of each other when electrically decoupled.

10. The hybrid electric vehicle drive system of claim 7, wherein the controller is further configured to decouple the energy storage DC bus from the propulsion DC bus and to cause energy to be transmitted between the battery energy storage subsystem and the first ultracapacitor energy storage subsystem via the energy storage DC bus during periods of vehicle propulsion.

11. The hybrid electric vehicle drive system of claim 9, wherein the controller is further configured to first route energy from the propulsion DC bus to the first ultracapacitor energy storage subsystem over the energy storage DC bus, then to decouple the energy storage DC bus from the propulsion DC bus, and to shuffle energy from the first ultracapacitor energy storage subsystem across the energy storage DC bus to the battery energy storage subsystem after decoupling the energy storage DC bus from the propulsion DC bus.

12. The hybrid electric vehicle drive system of claim 11, further comprising a third propulsion energy storage subsystem including a second ultracapacitor energy storage subsystem;

wherein the energy storage DC bus is electrically coupled to the third propulsion energy storage subsystem, and is further configured transmit energy among the first, the second and the third propulsion energy storage subsystems;

wherein the second ultracapacitor energy storage is maintained ready at a either a substantially full state of charge in anticipation of a vehicle acceleration event, or a substantially discharged state of charge in anticipation of a vehicle deceleration event; and, wherein the controller is further configured to first route energy from the propulsion DC bus across the energy storage DC bus to the first ultracapacitor energy storage subsystem, then to decouple the energy storage DC bus from the propulsion DC bus, and shuffle energy from the first ultracapacitor energy storage subsystem across the energy storage DC bus to the battery energy storage subsystem in response to decoupling the energy storage DC bus from the propulsion DC bus.

13. The hybrid electric vehicle drive system of claim 6, further comprising a third propulsion energy storage subsystem including a second ultracapacitor energy storage subsystem; and, wherein the energy storage DC bus is electrically coupled to the third propulsion energy storage subsystem, and is further configured transmit energy among the first, the second and the third propulsion energy storage subsystems.

14. The hybrid electric vehicle drive system of claim 1, wherein at least one of the first energy storage DC-to-DC converter and the second energy storage DC-to-DC converter is based on a first technology; and, wherein the bus-to-bus DC-to-DC converter is based on a second technology, different from the first technology.

15. The hybrid electric vehicle drive system of claim 14, wherein the at least one of the first energy storage DC-to-DC converter and the second energy storage DC-to-DC converter is metal-oxide-semiconductor field-effect transistor ("MOSFET")-based; and, wherein the bus-to-bus DC-to-DC converter is insulated-gate bipolar transistor ("IGBT")-based.

16. The hybrid electric vehicle drive system of claim 1, wherein one or more vehicle electrical accessories are electrically coupled to and driven by the energy storage DC bus.

* * * * *